(12) United States Patent
Braathen

(10) Patent No.: US 10,139,128 B2
(45) Date of Patent: Nov. 27, 2018

(54) PRESSURE TANK FOR A WATER HEATER IN STAINLESS STEEL, AND ALSO A METHOD FOR MANUFACTURE OF A PRESSURE TANK

(71) Applicant: Thor Frölich Braathen, Eggedal (NO)

(72) Inventor: Thor Frölich Braathen, Eggedal (NO)

(*) Notice: Subject to any disclaimer, the term of this patent is extended or adjusted under 35 U.S.C. 154(b) by 0 days.

(21) Appl. No.: 15/117,253

(22) PCT Filed: Feb. 11, 2015

(86) PCT No.: PCT/NO2015/050029
§ 371 (c)(1),
(2) Date: Aug. 8, 2016

(87) PCT Pub. No.: WO2015/122779
PCT Pub. Date: Aug. 20, 2015

(65) Prior Publication Data
US 2016/0341446 A1 Nov. 24, 2016

(30) Foreign Application Priority Data
Feb. 11, 2014 (NO) .................................... 20140170

(51) Int. Cl.
*B65D 6/00* (2006.01)
*F24H 1/18* (2006.01)
(Continued)

(52) U.S. Cl.
CPC ............. *F24H 1/181* (2013.01); *B21D 51/18* (2013.01); *B23K 33/00* (2013.01)

(58) Field of Classification Search
CPC ........... F24H 1/18–1/208; B21D 51/18–51/54; B23K 33/00–33/008
(Continued)

(56) References Cited

U.S. PATENT DOCUMENTS 2,230,021 A 1/1941 Weibel et al.
3,113,542 A 12/1963 Zundel
(Continued)

FOREIGN PATENT DOCUMENTS

DK 200600284 U3 12/2006
JP 2002211558 A 7/2002
(Continued)

OTHER PUBLICATIONS

Peltonen, Marko, "International Search Report," prepared for PCT/NO2015/050029, dated May 11, 2015, eight pages.

*Primary Examiner* — Kareen Thomas
(74) *Attorney, Agent, or Firm* — Winstead PC

(57) ABSTRACT

The present invention relates to a pressure tank in stainless steel to be used as a water heater. The tank is provided by two identical tank halves (12a, 12b; 14a, 14b). The two tank halves are joined about a common dividing plane (7) and have a longitudinal axis (26) that lies in the dividing plane (7) so that an extended tank is provided. The tank halves have welding flanges (22a, 22b) that are placed against each other in the joint dividing plane (7) and are joined together by welding or melting of the flanges (22a,22b) to a water-tight tank. The plate thickness is calculated according to the maximum test pressure of the tank and not limited by the welding. An efficient welding of the internal welding seam (24), by placing the tank in a rig and rotating the tank, provides safe protection against corrosion in the weld.

9 Claims, 3 Drawing Sheets

(51) Int. Cl.
  *B23K 33/00* (2006.01)
  *B21D 51/18* (2006.01)
(58) Field of Classification Search
  USPC .................................... 220/4.01–4.34, 6–8
  See application file for complete search history.

(56) References Cited

U.S. PATENT DOCUMENTS

| | | | | |
|---|---|---|---|---|
| 4,241,843 A | * | 12/1980 | Walker | B65D 90/046 220/4.12 |
| 4,595,037 A | * | 6/1986 | LeBreton | F15B 1/14 138/30 |
| 4,779,757 A | * | 10/1988 | Fuckert | B01J 19/02 220/4.12 |
| 2001/0054613 A1 | | 12/2001 | Straetz | |
| 2008/0067179 A1 | | 3/2008 | Graf | |

FOREIGN PATENT DOCUMENTS

| | | |
|---|---|---|
| JP | 2011117694 A | 6/2011 |
| WO | WO-2013055433 A2 | 4/2013 |

* cited by examiner

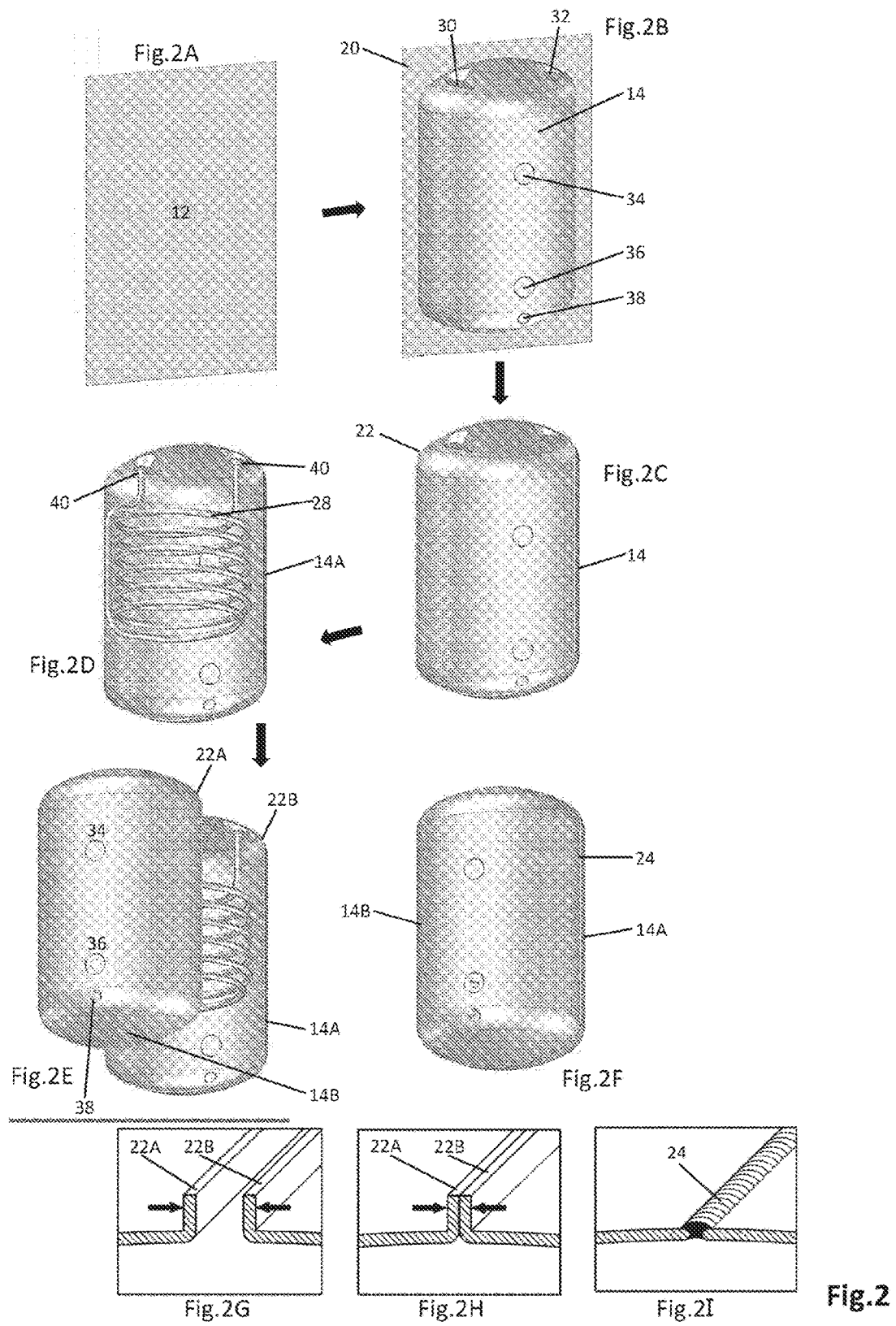

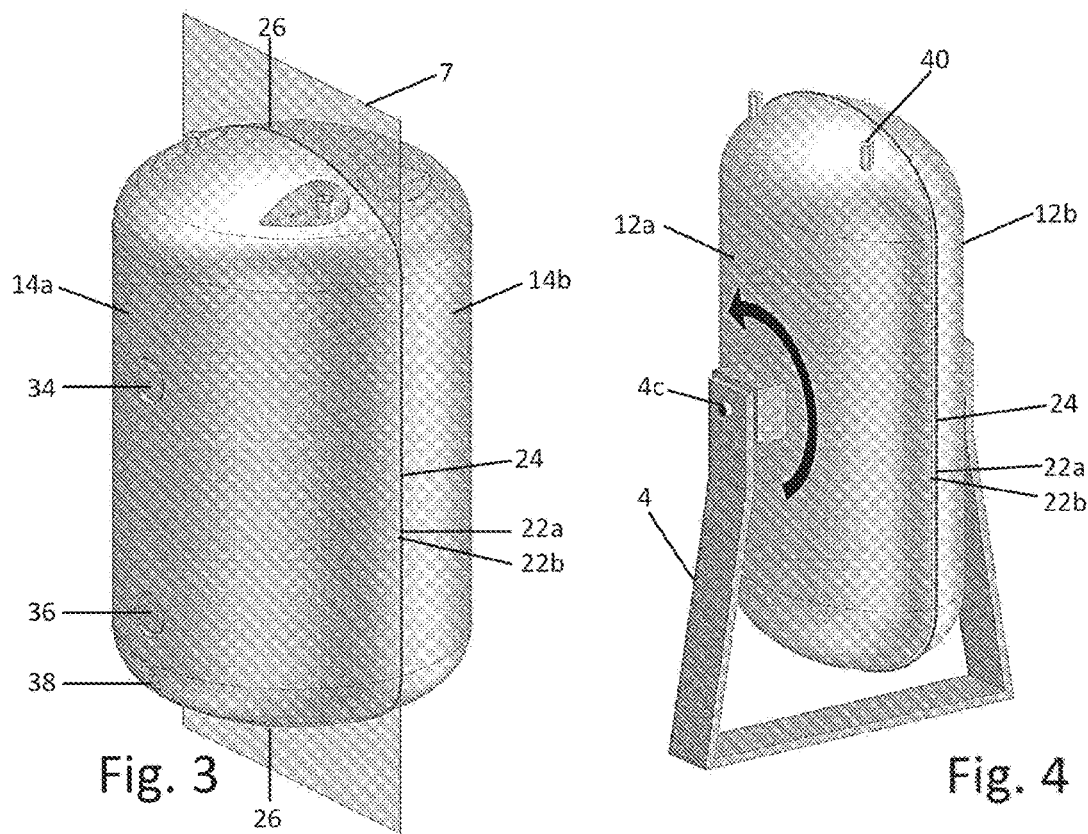

PRESSURE TANK FOR A WATER HEATER IN STAINLESS STEEL, AND ALSO A METHOD FOR MANUFACTURE OF A PRESSURE TANK

The present invention relates to a pressure tank for a water heater in stainless steel. The invention also relates to a method to manufacture the pressure tank.

Today, the most employed technology for the manufacture of pressure tanks in stainless steel is, in principle, shown in the enclosed FIG. 1.

FIG. 1 shows a pressure tank in stainless steel comprising a rolled plate that is welded longitudinally in a weld 1 to a tube S and turned at both ends. Two rondells (P1 and P2) are deep drawn to a top and a bottom, holes are punched out for connections and turned surfaces for welds between the tube and the top P1. The insertion of a coil 28 takes place through the connections in the top P1 thereafter to circumferentially weld the top P1 and the bottom P2 to the tube S in welds 2 and 3. In a 200 liter tank with a diameter of 50 centimeters, there are about four meters of welds distributed between the welds 1, 2 and 3. As the welds are butt welds (see the sections at the bottom in FIG. 1), great accuracy is required and about 1.2 millimeter material thickness for the plates in a laser welding without additional material, to avoid holes in the weld joints.

Furthermore the tank comprises relatively many parts, and a lot of welding and much material are required.

P1 and P2 can also be welded to each other, but because of limitations in how deeply one can force these in a deep drawing, where the diameter of the tank is around 50 centimeters, the volume of the tank is limited to about 100 liters.

US 2008067179 describes a water tank manufactured from plastic. It comprises two identical end parts and a possible middle section between these. As the tank parts are in plastic, there are relatively few limitations as to how deep these can be. However, a plastic tank is not suited to be used as a water heater where the temperature and pressure are relatively high. According to this known solution, the joining together of the tank parts takes place with the help of a clamp ring and gaskets.

DK 200600284U3 describes a ball-formed hot water tank. This is manufactured from two halves. How the two halves are joined is not described.

JP 2002211558 describes a fuel tank. This is manufactured from two different parts that are joined together to make a relatively flat tank, which is adapted to the placing of the tank in a vehicle. The joining together seems to be carried out in that flanges on the two halves are welded together. The flanges are intact after the welding and a pronounced slit is formed on the inside of the tank. As the tank is to be filled with fuel, corrosion problems will not be as relevant for this tank as for a hot water tank. Furthermore, the relatively flat shape is not suited to a pressure tank.

US 2001/0054613 also describes a fuel tank. This is made from plastic. It is manufactured in that two halves with respective flanges are placed against each other and joined. The flanges remain intact after the joining together.

WO 2013/055433 describes a method to add an aerogel coating on the inside of a tube or a ball, where the ball is rotated about two axes to distribute the coating.

THE OBJECTIVES OF THE INVENTION

One objective of the invention is to use fewer, and mostly equal, parts. It is also an objective of the invention to form a shorter welding path, and also a weld joint that has enough material for the fusing together of the two parts to take place without the use of additional material. Similarly, it is an objective to be able to weld by using a greater strength of current and also to be able to operate at a higher welding speed by using laser welding without additional material. A wanted result of this is that it is possible to use thinner plates for the tanks. Thereby, one can achieve a weld joint that gives a safe weld without any through-burning, in spite of using about 20% thinner plates.

This reduces the weight, and the thickness of the plates is only limited by the necessary test pressure that does not lead to permanent deformation. Therefore, the weld joint is not the limiting factor. The present invention is particularly suited for use together with connections that can be inserted in the tank without welding, as described in the simultaneously submitted patent application NO20140171, with the title "Pipe end piece for tank in stainless steel, steel or plastic and also a method for fastening of the end piece to the tank". With the use of both these inventions one achieves the possibility for a rapid assembly of parts inside the tank at the same time that the tank is not weakened due to the heat stress from the welding. As a further result of this invention and the invention in the above mentioned parallel application, the number of working operations is reduced, one gets a shorter cycle time and a better tank at a lower price.

These and other aims of the invention are achieved with a pressure tank for a water heater characterised in that it comprises two identical deep drawn tank halves that are welded together in a common dividing plane, that the tank has a longitudinal axis that lies in the dividing plane, so that a cylindrical, extended tank with a circular cross section is provided.

As the tank halves are moulded or deep drawn metal plates with an encircling flange, and the flange is used for the joining together of the two tank halves by welding of the flanges without additional material, as the flange in its entirety is melted during the welding and forms a surface which largely is in line with the tank wall both on the inside and the outside, and thereby does not lead to a welding seam gap on the inside of the tank, a good weld is obtained with a relatively small wall thickness for the tank.

The tank halves preferably comprise plane sections for the connection of pipe end pieces, as the plane sections are formed in the same operation as the moulding or deep drawing. Thus, one will be able to manufacture the tank in fewer operations. The pipe end pieces will also lie partially protected under the plane of the tank wall.

The objective of the invention is also achieved by a method for the manufacture of a pressure tank, characterised in that two identical tank halves are manufactured by deep drawing and that the two tank halves are welded together in a common dividing plane, as the resulting longitudinal axis of the tank lies in the common dividing plane so that a cylindrical, extended tank with a circular cross section is provided, that the two tank halves are formed with respective encircling flanges. Said flanges are used as melting material for the joining together, without further addition of material, in the welding of the two tank halves, as the flange material melts down into a weld seam which is largely in line with the tank wall, both on the inside and the outside, and thereby does not result in any weld seam slit on the inside of the tank.

The flanges are preferably protruding from the tank wall by about 3 mm with a plate thickness of about 1 mm. It has been found that this gives an optimal weld without the need for additional material and without excess material.

In a preferred embodiment the tank is clamped after the welding so that it can rotate about a rotational axis that extends perpendicularly to the dividing plane, that a limited amount of staining liquid (acid) is poured into the tank, that the tank is rotated at least one complete rotation about the axis of rotation so that the staining fluid is made to run along the weld seam on the inside of the tank, and that the remaining fluid is thereafter poured out of the tank, as the amount of staining fluid is adjusted so that it is sufficient to cover the weld seam, but that the application of staining fluid outside of the weld is avoided as much as possible. Thus, it is ensured that the staining fluid is only applied where there is a need and the need for staining fluid is reduced to a minimum.

In that during the forming of the tank halves, flat sections are also formed in the tank wall for the connection of pipe end pieces through the tank wall, the number of steps in the manufacturing process will be reduced.

In that the internal tubes in the tank, such as coil and inlet and outlet tubes, are fitted in at least one of the tank halves before the joining together of the tank halves, the manufacturing process will be simplified further. One will also have better access during the fitting. It will also be simpler to control internally that the fitting has been carried out in a satisfactory way.

With the present invention one can simply adapt the volume of the tank by making the longitudinal axis shorter or longer, while the depth in the deep drawing is the same, i.e. of about 250 mm. This gives a tank with a diameter of 500 mm, which is appropriate for the building of a water heater with an external diameter of 600 mm. By varying the longitudinal axis the tank can be manufactured in all volumes between 50 liters and at least 400 liters.

DRAWINGS

FIG. 1 illustrates, as mentioned above, a method for the manufacture of a tank according to prior art.

The FIGS. 2a-2f show the manufacture of a tank according to the invention step by step:

FIG. 2a shows a sample of a plate for the manufacture of a tank half.

FIG. 2b shows the plate sample after deep drawing of a tank half.

FIG. 2c shows the tank half after excess material on the flange has been removed.

FIG. 2d shows a tank half with a fitted coil.

FIG. 2e shows two tank halves that are about to be joined together.

FIG. 2f shows a completed tank.

Figure 1:
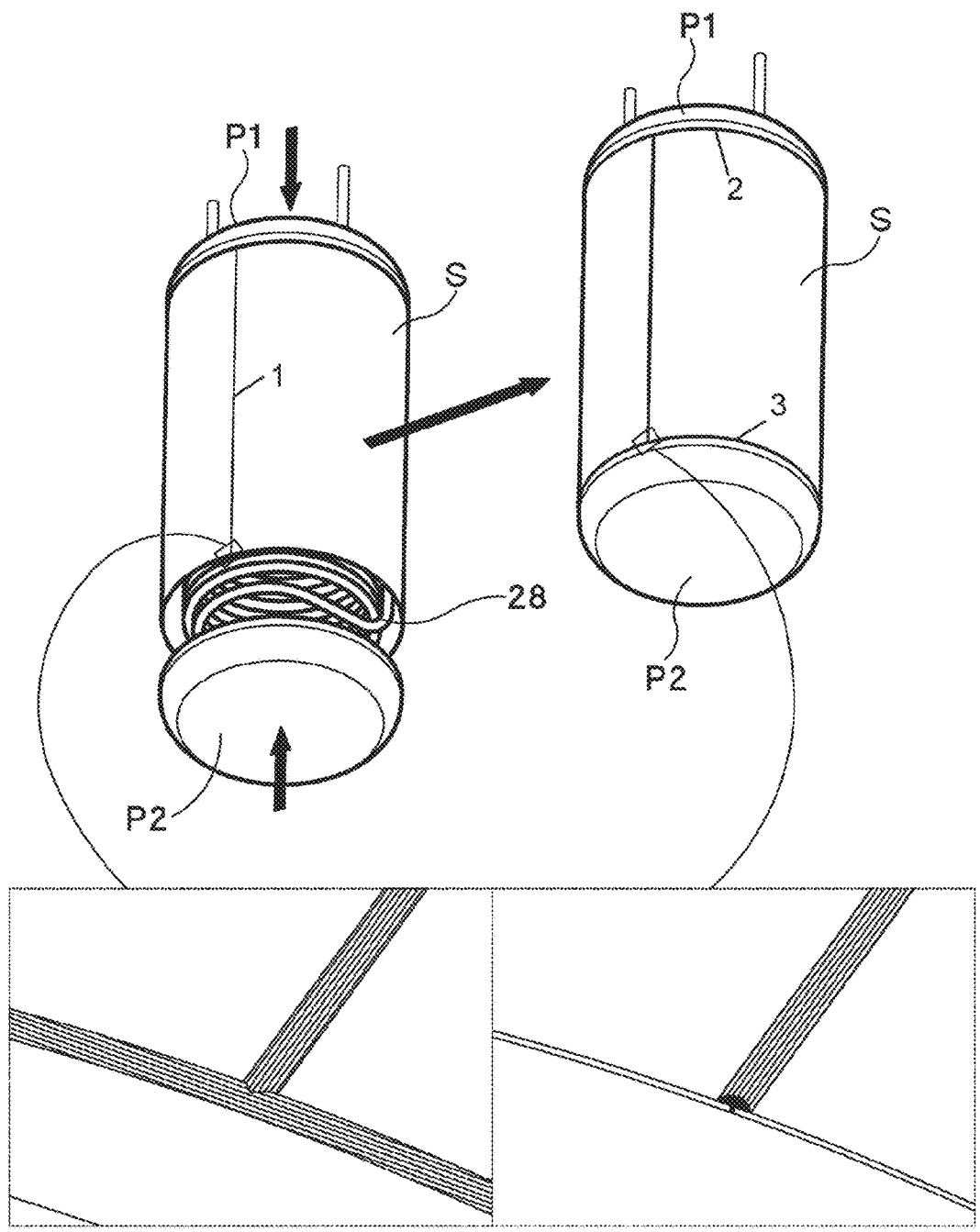

The FIGS. 2g-2i illustrate welding flanges and welding seams for the welding together of the two tank halves:

FIG. 2g shows a section of the tank halves that are about to be joined together.

FIG. 2h shows a section of the tank halves in a joined assembly.

FIG. 2i shows a section after the two tank halves are welded together.

FIG. 3 shows an assembled tank in greater detail.

FIG. 4 shows a possible frame for the rotation of the tank during internal staining of the weld seam.

The FIGS. 2a-f illustrate schematically an imagined production line where FIG. 2a shows a plate 12, or possibly a plate roll (not shown), that shall be led into a large deep drawing press (not shown) with a forming tool (not shown) that corresponds to the desired form. In FIG. 2b the plate is deep drawn to a desired shape to form a tank half 14. The deep drawing form can produce, for example, a half tank part corresponding to a tank with a diameter of 500 millimeters, but the length can be variable to give the desired volume. In the form there are also inserted plate recesses 30, 32, 34, 36, 38 for the connections, for example. The necessary clamping of the plate occurs in the area 20 that lies in the dividing plane of the form, and a plate flange is thereby made in the dividing plane around the whole of the container half 14.

FIG. 2c shows the same tank half 14 where nearly the whole plate flange 20 is removed, for example, by being burnt away with the help of a laser. However, a welding flange 22 with a height of, for example, 3 mm with a plate thickness of about 1 mm, is retained around the whole of the edge of the tank half 14. This provides an appropriate height of the weld flange 22 and an optimal amount of material for the weld, as will be explained later.

FIG. 2d shows the same tank half 14 that is now referred to by 14a. Cut outs have now been punched out in the plane areas 30 and 32 with an inwardly turned cylindrical flange with a depth of, for example, 6 millimeters. Thereafter a coil 28 is inserted with two end pieces 40 welded on and screwed securely into the flanges at the plane areas 30 and 32. End pieces are inserted in the same way according to need in the other plane areas 34, 36, 38. It is preferred that pipe end pieces and the method described above in the parallel application are used.

FIG. 2e shows a second tank half that is referred to as 14b. This has been deep drawn in a corresponding process to the first half 14a. The first and the second halves 14a and 14b are identical. This reduces the number of different parts. In the second half 14b, holes for the fastening of the connections of end pieces in the flat sections 30, 32, 34, 36, 38 are also punched out wherever they are needed. The inlet tube and the outlet tube (not shown) are fitted in the tank half via openings in the top, corresponding to the fitting of the coil 28.

FIG. 2e shows that the second half 14b is placed on top of the first half 14a for welding together in the welding flanges 22a, 22b (see FIG. 2g). Thereafter, the two halves are welded together in the joint 24 to a complete tank with a circular cross section, as shown in FIG. 2f. The tank is now also complete w.r.t. content, i.e. coil, inlet and outlet pipes and pipe end pieces.

The welding itself is illustrated in the FIGS. 2g-i. In FIG. 2g the halves are about to be placed together. In FIG. 2h the halves are placed together and the flanges 22a and 22b are held tightly together with the help of suitable means. In FIG. 2i the flanges 22a and 22b are welded together to a welding seam 24 by welding without additional material, such as, for example, TIG welding. Other welding methods without additional material can, of course, also be used. With a relatively small material thickness of the plate material, a height of about 3 mm on the flanges 22a and 22b will still provide a sufficient amount of material to be able to melt down to an adequate weld. By adjusting the available amount of material for the weld, one can obtain a complete weld both on the inside and the outside of the tank, i.e. without any weld seam crevices, but where the weld is essentially in line with the tank wall. Thereby there are no crevices that may lead to corrosion when the tank is full.

FIG. 3 shows the welded together tank in more detail. It is comprised of two, identical container halves 14a and 14b that are welded together with a common dividing plane 7. The dividing plane coincides with a longitudinal axis 26 to provide an extended tank. Similarly, necessary recesses 30, 32, 34, 36, 38 in the tank are shown for the provision in the tank of connectors and a welding joint 24 formed by the flanges 22a and 22b.

FIG. 4 shows a tank according to the invention manufactured from two halves 12a and 12b. After the welding the tank is clamped into a frame 4 around an axis of rotation 4c. For the staining of the weld 24 inside the tank, about 1 liter of staining fluid is poured in through a pipe end piece 40. The staining fluid runs down in the centre of the bottom. When the tank is rotated about the axis of rotation 4c the liquid will run along the weld 24 which will always be at the bottom of the tank. Thereby, the liquid will cover the whole of the internal weld. The liquid will not run to other parts of the tank, but will only be used where it is needed. After a 360 degrees rotation, the staining liquid will be poured out through the same pipe end piece 40 and test pressure with water will remove the residues of the staining liquid.

With the present invention there are about ⅓ fewer parts to the tank and there is between about 30% and 60% less distance to weld. The amount of material used can be reduced with about 20%, particularly in that it is possible to reduce the plate thickness. Furthermore, it is simpler to insert pipe end pieces, coils, etc, as this can be carried out before the halves are welded together. Pipe end pieces and a coil are fitted by being screwed in instead of welding. Similarly a 100% safe way to stain the internal weld seam is obtained without covering other parts of the tank with the staining liquid. With the help of the weld flanges one gets a very safe and strong weld in spite of using thin material.

The invention claimed is:

1. A pressure tank for a water heater of stainless steel, the tank being a hollow body, the tank comprising:
   a circular-cylindrical middle portion, and hemispherical end portions, a length of the cylindrical middle portion being greater than a diameter of the cylindrical middle portion;
   wherein the cylindrical middle portion comprises two identical deep drawn tank halves each comprising half of said cylindrical middle portion and half of each hemispherical end portion, so that a common dividing plane of said tank halves coincides with a longitudinal axis of said tank;
   said tank halves being welded together at said common dividing plane; and
   the two tank halves, during the deep drawing, are provided with an encircling flange, said flange providing welding material for fusing together the two tank halves by welding of the flange by melting said flange and forming a surface that is largely flush with a tank wall, both on the inside and the outside and thereby avoiding any weld seam crevices on an inside of the tank.

2. The pressure tank according to claim 1, wherein the two tank halves comprise planar sections for insertion of pipe end pieces, the planar sections being formed in the same operation as the deep drawing.

3. The pressure tank according to claim 1, wherein before the welding, the flange protrudes out from the tank wall by approximately 3 mm and a plate thickness is approximately 1 mm.

4. The pressure tank according to claim 1, wherein the pressure tank further comprises internal tubes in the tank that have been fitted in at least one of the two tank halves before joining of the tank halves.

5. The pressure tank according to claim 4, wherein the internal tubes comprise at least one of coils, inlet tubes, and outlet tubes.

6. A pressure tank for a water heater of stainless steel, the tank being a hollow body, the tank comprising:
   a circular-cylindrical middle portion, and hemispherical end portions, a length of the cylindrical middle portion being greater than a diameter of the cylindrical middle portion;
   wherein the cylindrical middle portion comprises two identical deep drawn tank halves each comprising half of said cylindrical middle portion and half of each hemispherical end portion, so that a common dividing plane of said tank halves coincides with a longitudinal axis of said tank;
   said tank halves being welded together at said common dividing plane;
   the two tank halves, during the deep drawing, are provided with an encircling flange, said flange providing welding material for fusing together the two tank halves by welding of the flange by melting said flange and forming a surface that is largely flush with a tank wall, both on the inside and the outside and thereby avoiding any weld seam crevices on an inside of the tank; and
   wherein the pressure tank further comprises internal tubes in the tank—that have been fitted in at least one of the two tank halves before joining of the tank halves.

7. The pressure tank according to claim 6, wherein the two tank halves comprise planar sections for insertion of pipe end pieces, the planar sections being formed in the same operation as the deep drawing.

8. The pressure tank according to claim 6, wherein before the welding, the flange protrudes out from the tank wall by approximately 3 mm and a plate thickness is approximately 1 mm.

9. The pressure tank according to claim 6, wherein the internal tubes comprise at least one of coils, inlet tubes, and outlet tubes.

* * * * *